(12) United States Patent
Gössi

(10) Patent No.: US 9,556,318 B2
(45) Date of Patent: Jan. 31, 2017

(54) THERMOPLASTIC FOAMING AGENT

(71) Applicant: SIKA TECHNOLOGY AG, Baar (CH)

(72) Inventor: Matthias Gössi, Uster (CH)

(73) Assignee: SIKA TECHNOLOGY AG, Baar (CH)

( * ) Notice: Subject to any disclaimer, the term of this patent is extended or adjusted under 35 U.S.C. 154(b) by 14 days.

(21) Appl. No.: 14/426,262

(22) PCT Filed: Sep. 6, 2013

(86) PCT No.: PCT/EP2013/068422
§ 371 (c)(1),
(2) Date: Mar. 5, 2015

(87) PCT Pub. No.: WO2014/040913
PCT Pub. Date: Mar. 20, 2014

(65) Prior Publication Data
US 2015/0225527 A1      Aug. 13, 2015

(30) Foreign Application Priority Data
Sep. 11, 2012  (EP) .................................. 12183895

(51) Int. Cl.
| | |
|---|---|
| *C08J 9/06* | (2006.01) |
| *C08J 9/10* | (2006.01) |
| *C08J 9/00* | (2006.01) |
| C08L 23/08 | (2006.01) |

(52) U.S. Cl.
CPC .............. *C08J 9/103* (2013.01); *C08J 9/0061* (2013.01); *C08J 2203/04* (2013.01); *C08J 2323/08* (2013.01); *C08J 2423/06* (2013.01); *C08J 2423/08* (2013.01); *C08J 2423/20* (2013.01); *C08L 23/08* (2013.01); *C08L 23/0853* (2013.01); *C08L 2205/02* (2013.01); *C08L 2205/025* (2013.01); *C08L 2207/07* (2013.01)

(58) Field of Classification Search
None
See application file for complete search history.

(56) References Cited

U.S. PATENT DOCUMENTS

| | | | |
|---|---|---|---|
| 4,226,946 A | 10/1980 | Park et al. | |
| 5,356,941 A | 10/1994 | Sullivan et al. | |
| 5,932,659 A | 8/1999 | Bambara et al. | |
| 6,150,428 A | 11/2000 | Hanley, IV et al. | |
| 6,528,550 B1* | 3/2003 | Hsu ........................ | C08J 9/0061 36/43 |
| 2003/0013778 A1* | 1/2003 | Sueda .................... | C08J 9/0023 521/142 |
| 2009/0173906 A1* | 7/2009 | Park ..................... | C08L 23/0853 252/62.54 |

FOREIGN PATENT DOCUMENTS

| | | |
|---|---|---|
| EP | 0982362 A1 | 3/2000 |
| EP | 2077283 A1 | 7/2009 |
| JP | 06254980 A  * | 9/1994 |
| WO | WO-02/00420 A1 | 1/2002 |
| WO | WO-02/22339 A1 | 3/2002 |
| WO | WO-2008/019400 A2 | 2/2008 |

OTHER PUBLICATIONS

Kontopoulou et al., "Rheology, Structure, and Properties of Ethylene-Vinyl Acetate/Metallocene-Catalyzed Ethylene-α-Olefin Copolymer Blends," Journal of Applied Polymer Science, vol. 94, (2004), pp. 881-889.*
Klempner, D., Frisch, K. C.: "Handbook of Polymeric Foams and Foam Technology", Hanser Publisher, Munich, 1991, p. 238.
Kulin, L. I., Meijerink, N. L., Starck, P.: "Long and Short Chain Branching Frequency in Low Density Polyethylene (LDPE)", Pure and Applied Chemistry, vol. 60, No. 9 , 1988, pp. 1403-1415.
International Search Report (in English and German) and Written Opinion of the International Searching Authority (in German) for PCT/EP2013/068422, mailed Oct. 1, 2013; ISA/EP.

* cited by examiner

*Primary Examiner* — Kara Boyle
(74) *Attorney, Agent, or Firm* — Buchanan Ingersoll & Rooney PC

(57) ABSTRACT

The invention describes a foamable thermoplastic mixture, comprising (A) at least one thermoplastic polymer selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer, (B) at least one long chain branched polymer as a foam stabilizer selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer and (C) at least one chemical blowing agent, wherein the long chain branched polymer (B) is present in an amount of 1 to 30 wt. % relative to the total weight of thermoplastic polymer (A) and long chain branched polymer (B), and at least one of the following distinguishing features applies to the thermoplastic polymer (A) and the long chain branched polymer (B): 1) the value of the melt flow index (MFI) of the long chain branched polymer (B) (MFI(B)) is smaller than the MFI value of the thermoplastic polymer (A) (MFI(A)), wherein MFI(B) is a maximum of 50% of MFI(A), 2) the g value of the long chain branched polymer (B) (g(B)) is smaller than the g value of the thermoplastic polymer (A) (g(A)), wherein g(B) is a maximum of 80% of g(A), 3) the polymer type of the long chain branched polymer (B) differing from the polymer type of the thermoplastic polymer (A). The foamable thermoplastic mixture can be injection molded without foaming and is suitable for the production of low-density foams which can be used, for example, as damping materials or foamed membranes.

21 Claims, 4 Drawing Sheets

LCB-EVA [wt.%]

Elvax 670 [wt.%]

LD 380 BA [wt.%]

LD 252 [wt.%]

ENR 7086 [wt.%]

THERMOPLASTIC FOAMING AGENT

CROSS REFERENCE TO RELATED APPLICATIONS

This application is a U.S. National Phase Application under 35 U.S.C. 371 of International Application No. PCT/EP2013/068422 filed on Sep. 6, 2013 and published in German as WO/2014/040913 on Mar. 20, 2014. This application is based on and claims the benefit of priority from European Patent Application No. 12183895.7 filed Sep. 11, 2012. The entire disclosures of all of the above applications are incorporated herein by reference.

TECHNICAL FIELD

The invention relates to a foamable thermoplastic mixture, the foamed material obtainable therefrom, and a method for producing it.

PRIOR ART

At present, long chain branched polymers are used for stabilizing polymer melts under high tensile stress, e.g., in processes such as melt-blowing for producing thin plastic webs (plastic bags) or biaxial stretching of shrink film (packaging) in large quantities for stabilizing polymer melts. The long chain branched polymers induce or massively increase the strain curing of the melts, which prevents rupture of the melt during the aforementioned processes. Examples of mixtures used in such cases are blends of LDPE (low-density PE) and HDPE (high-density PE polymers).

The effect of strain curing is also used for producing low-density polymer foams. As described, for example, in U.S. Pat. No. 4,226,946 or Klempner, D.; Frisch, K. C., Handbook of polymeric Foams and Foam Technology, Hanser Publisher, Munich, 1991, p. 238, for this purpose linear polymers such as HDPE or PP mixed with high proportions of long chain branched polymers or with free radical donors such as organic peroxides during the plasticization process are partially modified to form long chain branched polymers, to achieve strain-curing behavior in the melts of the resulting mixture.

The melt of long chain branched polymers has increased viscosity, which is not important in melt-blowing and biaxial stretching of packaging films. However, the increased viscosity is disadvantageous for injection molding applications.

Foamed materials are generally formed by foaming a polymer melt using a blowing agent and the foamed structure is then fixed by cooling. The polymeric foams formed at high temperatures (>melting temperature (Tm)) are usually stabilized to prevent the collapse of the polymeric foam structure.

To obtain low-density foam, the cells must grow following the formation of stable nuclei. Excessive cell growth leads to coalescence and collapse of the foam cells before they are stabilized. When the cell growth rate is too low on the other hand relatively low volume expansion and thus to materials of relatively high density are obtained. Thus, the control of cell growth is crucial for producing low-density foams and with a homogeneous, closed cell structure. Pure EVA polymers, for example, frequently exhibit excessive cell growth, so that stabilization is necessary.

Stabilization is all the more necessary, the lower the density of the foamed material is to be, i.e., the larger is the volume expansion. For example, uncontrolled growth and collapse of the foamed material are observed in the case of mixtures of conventional EVA-polymers with blowing agents in an adequate quantity to achieve volume expansions of more than 1000%.

Stabilization is usually achieved either by means of foam stabilizers or by crosslinking the thermoplastic melt. Foam stabilizers cause a change in gas permeability so that the blowing gas diffuses out of the bubble more slowly than the surrounding air enters into it. As a result, temporarily a gas overpressure is maintained in the bubbles of the foam, protecting the foam from collapse. The foam stabilizers used are low-molecular-weight, amphiphilic molecules, e.g., polyether-modified polysiloxanes (Tegostab® products) or glycerol monostearate (Dimodan HP® from Danisco). The crosslinking of the polymeric melt, on the other hand, prevents the melt from flowing. The use of low-molecular-weight foam stabilizers, however, presents problems during the mixing in and production of stable mixtures in nonpolar bulk plastics such as PE and iPP.

Thus, special requirements arise for formulations that are to be suitable for both injection molding and foaming, since in this case both foam stability and viscosity must be considered.

Multiple foamable mixtures based on thermoplastic polymers are already known from the prior art.

For example, U.S. Pat. No. 5,356,941 describes foamable compositions based on thermoplastic polymers such as polyethylene vinyl acetate and polyethylene acrylic acid or methacrylic acid copolymers foamed with blowing agents in the presence of a peroxide crosslinking agent.

WO 02/22339 A1 describes open-cell foams based on polyethylene vinyl acetate and a terpolymer of ethylene, vinyl acetate and carbon monoxide foamed with a blowing agent in the presence of a surfactant.

U.S. Pat. No. 6,150,428 describes an expandable sealant based on a grafted anhydride polymer and an epoxy-terminated additive polymer, which is foamed with the aid of a blowing agent.

WO 2008/019400 A1 describes curable sealing compositions based on radiation-crosslinkable rubber and a mixture containing vinyl acetate, polyvinyl alcohol, a resin and a photoinitiator. In the sole example of WO 2008/019400 A1, a composition is described which, along with UV-curable SBS rubber, contains fillers, ethylene-vinyl acetate copolymers, thermoplastic pentaerythrol ester resins, blowing agents and photoinitiators.

Finally, U.S. Pat. No. 5,932,659 discloses polymer mixtures of polyethylene vinyl acetate and very low density polyethylene (VLDPE) as a substitute for EPDM and other elastomers that can be foamed with the addition of blowing agents. In none of these documents long chain branched polymers are suggested as foam stabilizers.

PRESENTATION OF THE INVENTION

Figure 1:
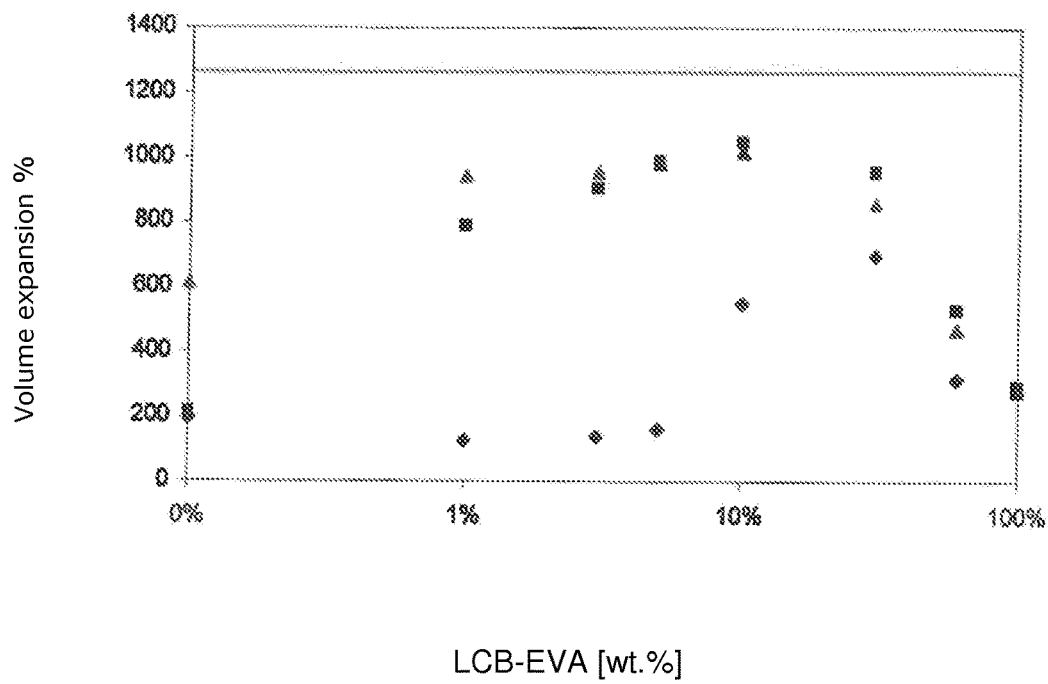
FIG. 1 is a graph of LCB-EVA (wt. %) vs. volume expansion %, according to an exemplary aspect.
Figure 2:
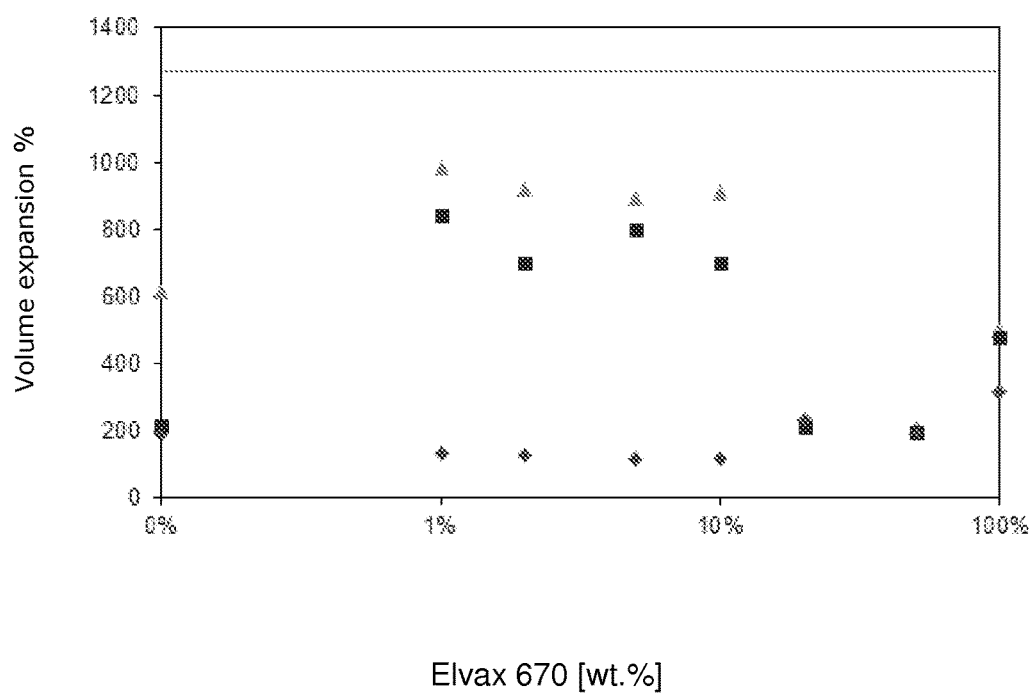
FIG. 2 is a graph of Elvax 670 (wt. %) vs. volume expansion %, according to an exemplary aspect.
Figure 3:
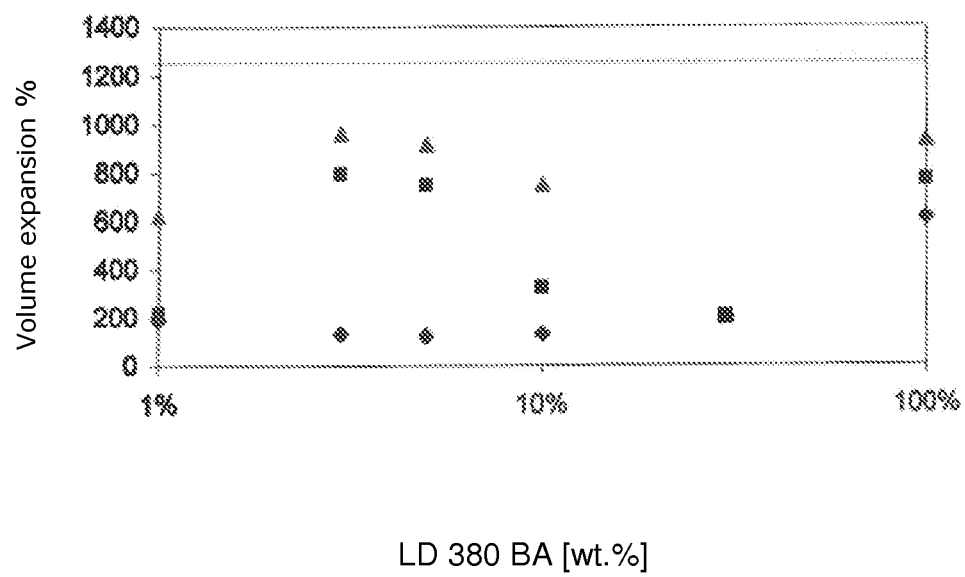
FIG. 3 is a graph of LD 380 BA (wt. %) vs. volume expansion %, according to an exemplary aspect.
Figure 4:
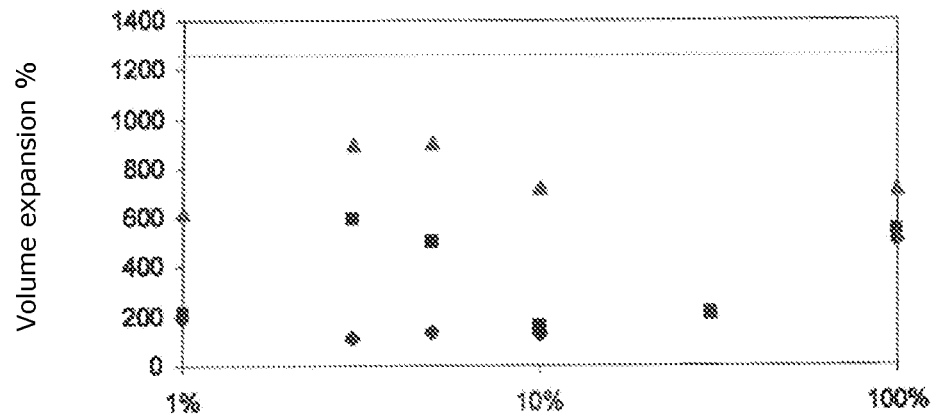
FIG. 4 is a graph of LD 252 (wt. %) vs. volume expansion %, according to an exemplary aspect.
Figure 5:
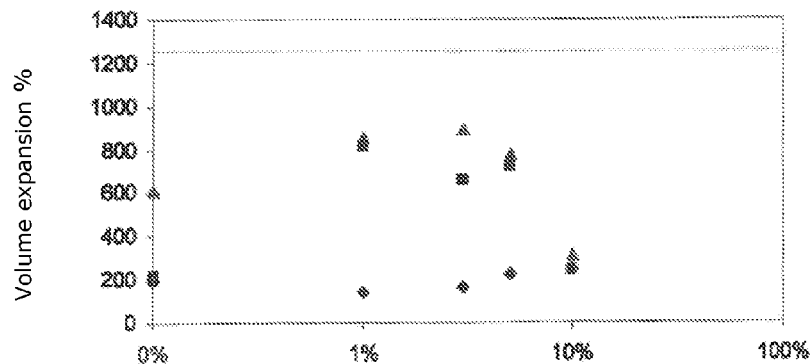
FIG. 5 is a graph of ENR 7086 (wt. %) vs. volume expansion %, according to an exemplary aspect.

The objective of the invention is to provide mixtures suitable for the production of foamed thermoplastic products, especially those of low density. Mixtures of thermoplastic polymers are to be provided which can be foamed to low densities (e.g., 50 kg/m$^3$; volume expansion 2000%) and nevertheless can be injection molded well. In addition, the invention should be applicable without problems to both polar and nonpolar polymer mixtures.

The problem is solved by a foamable thermoplastic mixture comprising (A) at least one thermoplastic polymers selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer, (B) at least one long chain branched polymers as foam stabilizer selected from ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer and (C) at least one chemical blowing agent, wherein the long chain branched polymer (B) is present in an amount of 1 to 30 wt. % relative to the total weight of thermoplastic polymer (A) and long chain branched polymer (B) is present and at least one of the following distinguishing features applies for the thermoplastic polymer (A) and the long chain branched polymer (B): 1) the value of the melt flow index (MFI) of the long chain branched polymer (B) (MFI(B)) is smaller than the MFI value of the thermoplastic polymer (A) (MFI(A)), wherein MFI(B) is a maximum of 50% of MFI(A), 2) the g value of the long chain branched polymer (B) (g(B)) is smaller than the g value of the thermoplastic polymer (A) (g(A)), wherein g(B) is a maximum of 80% of g(A), 3) the polymer type of the long chain branched polymer (B) differs from the polymer type of the thermoplastic polymer (A).

Surprisingly, the addition of long chain branched polymers to foamable thermoplastic polymer mixtures wherein at least one of the above-mentioned distinguishing features 1 to 3 applies, up to a certain fraction, causes only a relatively small or no increase in viscosity, while at the same time very good stabilization of the foam is achieved. The addition of the long chain branched polymers can produce improved volume expansion. Although not crosslinked and exhibiting little or no change in rheologic properties, foam structures made from the mixture according to the invention exhibit delayed collapse due to addition of the long chain branched polymers. Apparently, the long chain branched polymers cause a reduction of the blowing gas permeability. In addition, the long chain branched polymers, in contrast to conventional low-molecular-weight foam stabilizers, are pelletizable raw materials, which simplifies handling in the extrusion process.

The invention will be explained in detail below.

The foamable thermoplastic mixture comprises one or more thermoplastic polymers (A) and one or more long chain branched polymers (B) as foam stabilizers. The thermoplastic polymer (A) may be, for example a linear, short chain branched or long chain branched thermoplastic polymer.

Short chain branched and long chain branched polymers are well known to the person skilled in the art. These are polymers that have short chain branchings or long chain branchings. Short- or long chain branchings are side groups that are not present in every monomer unit of the polymer. Short chain branched polymers generally have oligomeric side groups with very low molecular weight compared with the molecular weight of the polymer. Long chain branched polymers generally have polymeric side groups Typically, the side groups of the long chain branched polymers are looped, which is not the case with the short chain branched polymers. As a result the long chain branchings affect the solid-state properties such as crystallinity but also can cause distinct changes in the rheologic properties. On the other hand, short chain branchings usually lead to a change in crystallinity. Long and short chains thus affect the properties of polymers quite differently. As a result of these differences in the properties, especially due to the looping ability of the long chain branchings, long chain branched and short chain branched polymers can be readily differentiated. By definition, a polymer with a g value of less than 1 is long chain branched.

The thermoplastic polymer (A) is selected from ethylene-vinyl acetate copolymer (EVA), ethylene-acrylic ester copolymer (EMA or EBA), ethylene-α-olefin copolymer (ethylene-hexene copolymer, ethylene-butene copolymer or ethylene-octene copolymer), polyethylene (PE), polypropylene (PP) and ethylene-propylene copolymer. Here, EMA is the acronym for ethylene methyl acrylate copolymer and EBA that for ethylene butyl acrylate copolymer. Preferably, these polymers contain no additional monomers beyond the constituents mentioned. It is also preferred that the thermoplastic polymer A is free from reactive functional groups, especially ketone, acid and anhydride groups. The thermoplastic polymer (A) may be any conventional thermoplastic polyolefin from the series mentioned that is suitable for foamable thermoplastic mixtures. The thermoplastic polymer (A) is preferably an ethylene-vinyl acetate copolymer (EVA).

The long chain branched polymer (B) used as foam stabilizer can be any usual long chain branched polymer selected from ethylene-vinyl acetate copolymers (EVA), ethylene-acrylic ester copolymers (EMA or EBA), ethylene-ε-olefin copolymers (ethylene-hexene copolymer, ethylene-butene copolymer or ethylene-octene copolymer), polyethylenes (PE), polypropylenes (PP) and ethylene-propylene copolymers. Long chain branched polymers are commercially available and can be readily produced using known methods by a person skilled in the art. They are usual polymers that additionally have long chain branchings. Likewise, the long chain branched polymer (B) is preferably a thermoplastic polymer. The long chain branched polymer (B) in particular does not contain any functional groups through which chemical bonding to the polymers of the foamable thermoplastic mixture would be possible, i.e., no crosslinking in the polymer mixture can take place via the long chain branched polymer (B). The long chain branched polymer (B) is preferably an ethylene-vinyl acetate copolymer (EVA).

Examples of commercially available long chain branched polymers (B) are LDPE and ethylene copolymers, manufactured in LDPE reactors (autoclave or tubular reactor), such as ethylene-vinyl acetate copolymers (EVA) or ethylene-acrylic ester copolymers (EMA and EBA). The ethylene copolymers, however, have a lower number of branching points than LDPE. In addition, long chain branched polymers can generally be obtained by allowing free radical formers such as organic peroxides or high-energy ionizing radiation to act on polymers, generally at elevated temperatures. These methods for producing long chain branched polymers are known to the person skilled in the art.

In order for the long chain branched polymer to act as a foam stabilizer, it is also necessary for the thermoplastic polymer (A) and the long chain branched polymer (B) to differ in a characteristic selected from the melt flow index (MFI), the degree of branching and the chemical composition.

Therefore, at least one of the following distinguishing features applies for the thermoplastic polymer (A) and the long chain branched polymer (B): 1) the value of the melt flow index (MFI) of the long chain branched polymer (B) (MFI(B)) is smaller than the MFI value of the thermoplastic polymer (A) (MFI(A)), wherein MFI(B) is a maximum of 50% of MFI(A) and preferably is a maximum of 25% of MFI(A), 2) the g value of the long chain branched polymer (B) (g(B)) is smaller than the g value of the thermoplastic polymer (A) (g(A)), wherein g(B) is a maximum of 80% of g(A) and preferably is a maximum of 60% of g(A), 3) the polymer type of the long chain branched polymer (B) differs from the polymer type of the thermoplastic polymer (A).

The melt flow index (MFI) of the thermoplastic polymer (A) used can vary within broad limits. The MFI of the thermoplastic polymer (A) can, e.g., be in the range of 0.1 to 100 g/10 min, but is preferably in the range of 0.5 to 40 g/10 min and more preferably in the range of 1 to 10 g/10 min. Likewise, the melt flow index (MFI) of the long chain branched polymer (B) used can vary within broad ranges. The MFI of the long chain branched polymer (B), for example, is in the range of 0.01 to 10 g/10 min and preferably in the range of 0.1 to 5. The MFI is determined at 190° C., 2.16 kg according to ASTM D1238.

The g value is a measure of the degree of branching of a polymer. Long chain branched polymers can be relatively easily characterized by the g value. The g value of polyolefins or the polymers and copolymers discussed herein can be determined by means of high-temperature GPC and is defined as the ratio of the intrinsic viscosity of the polymer to be analyzed to the intrinsic viscosity of a linear polymer, in this case the PE standard NBS 1475 (Kulin, L. I.; Meijerink, N. L.; Starck, P. *Pure and Applied Chemistry* 1988, 6, (9), 1403-1415). The so-called g-plot is obtained by plotting the g values as a function of the corresponding molecular weight fraction. The values used here correspond to the g value at the weight-average molecular weight ($M_w$).

Der g value of the thermoplastic polymer (A) can be, e.g., in the range of 0.20 to 1, preferably in the range of 0.2 to 0.5. The g value of the long chain branched polymer (B) used is, e.g., in the range of 0.05 to 0.8, preferably in the range of 0.05 to 0.3.

Alternatively, the degree of branching of polymers, especially of long chain branched polymers, can be characterized relatively easily using the LCBI (Long Chain Branch Index). A suitable long chain branched polymer (B), for example, preferably has an LCBI of at least 1.1 and preferably at least 1.25. The method for determination of the LCBI will be explained in the experimental section below.

Alternatively, therefore, the difference in the degree of branching between the thermoplastic polymer (A) and the long chain branched polymer (B) could also alternatively be expressed by the LCBI (distinguishing feature 2) instead of the g value. In this method, the LCBI of the long chain branched polymer (B) (LCBI(B)) would be at least 10% greater than the LCBI of the thermoplastic polymer (A) (LCBI(A)).

A third possible characteristic in which the long chain branched polymer (B) could differ from the thermoplastic polymer (A), is the fact that the polymer type of the long chain branched polymer (B) differs from that of the thermoplastic polymer (A). Here, polymer type relates to the chemical composition of the polymers or the monomers contained therein. According to the present invention the thermoplastic polymer (A) and the long chain branched polymer (B) may be selected from 9 different polymer types, namely EVA, EMA, EBA, ethylene-hexene copolymer, ethylene-butene copolymer, ethylene-octene copolymer, PE, PP and ethylene-propylene copolymer. Therefore, the thermoplastic polymer (A) and the long chain branched polymer (B) differ in polymer type if both are not EVA, EMA, EBA, ethylene-hexene copolymer, ethylene-butene copolymer, ethylene-octene copolymer, PE, PP or ethylene-propylene copolymer. If the thermoplastic polymer (A) is EVA and the long chain branched polymer (B) must differ in polymer type, it can be selected from one of the other 8 polymers, e.g., PE.

Insofar as the thermoplastic polymer (A) and the long chain branched polymer (B) differ in polymer type, it is preferred for the thermoplastic polymer (A) to be selected from ethylene-vinyl acetate copolymer (EVA), ethylene methyl acrylate copolymer (EMA) or ethylene butyl acrylate copolymer (EBA), and the long chain branched polymer (B) to be selected from polyethylene (PE), ethylene-hexene copolymer, ethylene-butene copolymer, ethylene-octene copolymer or ethylene-propylene copolymer, or it is preferred for the thermoplastic polymer (A) to be selected from polypropylene (PP) or ethylene-propylene copolymer and the long chain branched polymer (B) to be selected from polyethylene (PE), ethylene-vinyl acetate copolymer (EVA), ethylene methyl acrylate copolymer (EMA) or ethylene butyl acrylate copolymer (EBA).

Insofar the thermoplastic polymer (A) and the long chain branched polymer (B) differ in polymer type, it is particularly preferred for the thermoplastic polymer (A) to be an ethylene-vinyl acetate copolymer (EVA) and for the long chain branched polymer (B) to be a polyethylene (PE), especially a LDPE.

In a preferred embodiment the thermoplastic polymer (A) and the long chain branched polymer (B) are of the same polymer or copolymer type, wherein the polymers (A) and (B) differ in the MFI value according to distinguishing feature 1) as defined above or preferably in g value according to distinguishing feature 2) as defined above. If the two polymers are of the same polymer type, the thermoplastic polymer (A) and the long chain branched polymer (B) are both preferably an ethylene-vinyl acetate copolymer.

In a preferred embodiment the thermoplastic polymer (A) is also a long chain branched polymer and the long chain branched polymer (B) is a more highly long chain branched polymer, so that distinguishing feature 2) as defined above is met.

A particularly preferred foamable thermoplastic mixture comprises a long chain branched EVA as thermoplastic polymer (A) and a more highly long chain branched EVA as foam stabilizer (B), so that the g value of the long chain branched polymer (B) is a maximum of 80%, preferably is a maximum of 60%, of the g value of thermoplastic polymer (A). A higher degree of branching can be achieved, e.g., by reacting less extensive long chain branched polymers, preferably EVA-polymers, with free radical forming agents or irradiating with high-energy ionizing radiation, with formation of free radical sites in the polymer, leading to more extensive long chain branching.

The fractions of the thermoplastic polymer (A) and of the long chain branched polymer (B) in the foamable thermoplastic mixture can be varied within a broad range and depend, among other things, on the type of polymer used, the baking temperature and the intended use. However, the fraction of the thermoplastic polymer (A) can advantageously amount to, e.g., at least 40 wt. % and preferably at least 50 wt. % relative to the total weight of the foamable thermoplastic mixture. The fraction of the thermoplastic polymer (A) is, e.g., in the range of 40 to 97 wt. %, preferably 50 to 90 wt. % relative to the total weight of the foamable thermoplastic mixture.

The long chain branched polymer (B) as foam stabilizer is present in the foamable thermoplastic mixture in an amount of 1 to 30 wt. %, preferably 1 to 20 wt. % and particularly preferably 1 to 10 wt. % relative to the total weight of thermoplastic polymer (A) and long chain branched polymer (B).

Surprisingly, at contents of no more than 10 wt. % of foam stabilizer, for all foam stabilizers as defined in the present invention, no increase in the null viscosity was observed. As a result, the foaming behavior can be positively affected without changing the rheologic properties (in terms of both shear and strain). Thus, a viscosity effect does not apply, but rather a reduction in the blowing gas permeability, which was previously attributed exclusively to low-molecular-weight foaming agents.

A second special feature consisted of the fact that when long chain branched polymers (B), especially EVA-polymers, differing from thermoplastic polymer (A) in degree of branching according to distinguishing feature 2) are used, additional stabilization of the foam was obtained at a fraction of 10 to 30 wt. %. When long chain branched polymers differing from thermoplastic polymer (A) in MFI value according to distinguishing feature 1) or in polymer type according to distinguishing feature 3), but not in degree of branching according to distinguishing feature 2) are used, this foam stabilization was not observed at a fraction of 10 to 30 wt. %.

In a particularly preferred embodiment the foamable thermoplastic mixture comprises an EVA copolymer with a MFI of 3 to 10 g/10 min as thermoplastic polymer (A) and, relative to the total weight of thermoplastic polymer (A) and long chain branched polymer (B), 1 to 10 wt. % of a long chain branched EVA copolymer as foam stabilizer (B), preferably having a LCBI of 1.25 or higher. For this embodiment distinguishing feature 2) preferably applies.

An additional advantage of the mixture according to the invention consists of the fact that in contrast to the standard low-molecular-weight stabilizers, the long chain branched polymers can be adapted to the structure of the matrix polymers (A). In this way, the compatibility of the polymer can be improved.

The foamable thermoplastic mixture also comprises one or more chemical blowing agent. All standard, known chemical blowing agents can be used, e.g., solid, liquid or gaseous blowing agents, although solid blowing agents are preferred. Suitable blowing agents are known to the person skilled in the art and are commercially available.

Typically, the chemical blowing agent is a solid blowing agent. The chemical blowing agent is added to the polymer mixture of polymers (A) and (B), which is advantageously provided as a granular mixture, as a powder or granulate.

The chemical blowing agents are usually decomposed at the processing temperatures, releasing the blowing gases (e.g., $N_2$, CO, $CO_2$).

Examples of chemical blowing agents are organic blowing agents, such as azodicarbonamide, azobis(isobutyronitrile), diphenyl oxide-4,4'-disulfonic acid hydrazide and N-nitroso compounds, frequently in combination with nucleating agents, such as talc, catalysts such as metal oxides or color pigments. Inorganic chemical blowing agents are, e.g., sodium hydrogen carbonate or ammonium carbonate, frequently combined with weak organic acids such as citric acid. A preferred blowing agent is azodicarbonamide, e.g., catalyzed azodicarbonamide, commercially available, e.g., as Unicell® DL 75N.

The fraction of the blowing agent can vary within broad limits and depends, among other things, on the type of blowing agent, the polymer mixture used and the desired density of the foamed materials to be produced. The proportion of the blowing agent can be, e.g., in the range of 0.1 to 20 wt. %, preferably of 5 to 15 wt. % relative to the total weight of the foamable thermoplastic mixture.

The foamable thermoplastic mixture is preferably a mixture suitable for injection molding, i.e., the mixture has a viscosity at the processing temperatures suitable for injection molding. Especially, it can be injection molded without foaming.

The foamable thermoplastic mixture can also contain one or more additives. Examples of additives that may optionally be used are thixotropic agents, surfactants, processing aids such as waxes, crosslinking agents such as organic peroxides, antioxidants, UV stabilizers, dyes, biocides or flame retardants. The mixture can contain, e.g., preferably at least one additive selected from processing aids such as waxes, thixotropic agents such as hydrophobic silica, chalk or limestone, surfactants, nucleating agents such as talcum or lime, crosslinking agents such organic peroxides, and activators for chemical blowing agents such as ZnO, Zn stearates, urea or stearic acid. In addition, the composition may also be free from crosslinking agents.

The use of a thixotropic agent, a surfactant or mixtures can bring about additional stabilization of the foam. Thixotropic agents are inert fillers that can increase the flow stress. Suitable surfactants are amphiphilic materials that can influence the polarity of the cell walls or lead to further reduction of the blowing gas permeation during foaming. Surfactants and/or thixotropic agents can be used, for example, in a total amount of 0.1 to 6 wt. %, preferably 1 to 5 wt. % relative to the total weight of the foamable thermoplastic mixture.

Examples of thixotropic agents are chalk, lime and $SiO_2$ particles, preferably hydrophobic $SiO_2$ particles, for example hydrophobic pyrogenic silica. These can be obtained by surface modification of pyrogenic silicas with hydrophobic compounds such as polydimethylsiloxane or dimethyldichlorosilane. Examples of corresponding commercial products are HDK H18 from Wacker and Aerosil® R972 from Evonik. Examples of suitable surfactants are glycerol monostearate, siloxane-glycol random copolymers and polyether-modified polysiloxanes. Commercially available surfactants suitable for the foamable mixture are, e.g., Silbyk® 9000, Silbyk® 9020 and Silbyk® 9230 from BYK Chemie.

In contrast to organic peroxides, the use of crosslinking agents that require activation by radiation, especially by UV light, is less preferable, since such crosslinking agents must be amenable to activation by radiation. However, this is not possible in all applications of the foamable thermoplastic mixture of the present invention. Furthermore, the addition of such crosslinking agents proved not to be necessary for processing the foamable thermoplastic mixture. Within the framework of the present invention, therefore, it is preferred that the mixture contains no crosslinking agents that require activation by radiation.

The long chain branched polymer serves as a foam stabilizer within the framework of the present invention. In addition to the long chain branched polymer, additional foam stabilizers may be added, but it is preferable if the mixture according to the invention contains no additional foam stabilizers besides the long chain branched polymer.

The foamed material can be produced by foaming from the foamable thermoplastic mixture in the usual way known to the person skilled in the art. For the polymer mixture to be foamed, an adequate viscosity is necessary. For this purpose, it is heated, generally to temperatures above the softening point or above the melting temperature of the mixture. Since a chemical blowing agent is used, the blowing agent must decompose at the operating temperature for the foaming process. Then, the foamed structure is cooled to fix the foam structure.

The foaming of the foamable thermoplastic mixture preferably takes place by free foaming. Free foaming is defined as foaming at ambient pressure and at elevated temperature. In contrast to foaming from the extruder or in a closed mold, no massive overpressure can be generated to dissolve large quantities blowing gas in the polymers.

Naturally, the operating temperatures and baking times depend especially on the polymer mixture used. Typically, for foaming the foamable thermoplastic mixture, e.g., temperatures of at least 140° C., preferably at least 160° C. may be used. The baking time can be, e.g., in the range of 3 to 20 min, preferably of 5 to 12 min. However, of course, other temperatures and/or baking times are also conceivable, depending on the mixtures used.

The foamed material obtained is preferably a foamed material of relatively low density, e.g., with a density of 50 to 500 kg/m$^3$, preferably no more than 200 kg/m$^3$. Naturally, however, foamed materials with higher or lower density can also be produced. The foamed material is preferably a foamed thermoplastic product.

The foamed material according to the invention is suitable for all the usual areas of application, for example as an insulating, sealing, or damping material, e.g., for sound damping or heat damping, or as a molded article, e.g., as cushioning for furniture or mattresses. The foamed material according to the invention is particularly suitable as a sealing and damping material or foamed membrane layer. In sealing webs, e.g., foamed layers made from the foamed material according to the invention with a density of 200 to 500 kg/m$^3$ are suitable. Particularly preferred are thermoplastic foam made from the foamed material according to the invention with a density of 50 to 200 kg/m$^3$, especially for automotive engineering.

EXAMPLES

In the following several examples will be presented to further illustrate the invention, however, they are not intended to limit the invention in any way. Unless stated otherwise, all fractions and percentages are by weight. The following raw materials are used.

Elvax® 265A EVA copolymer with a vinyl acetate content of 28 wt. % from DuPont, MFI=3 g/10 min, Elvax® 670 EVA copolymer with a vinyl acetate content of 12 wt. % from DuPont, MFI=0.35 g/10 min LCB-EVA Long chain branched EVA according to the method of production described below LD 380 BA LDPE from Exxon Mobile, from a tubular reactor, MFI=1.9 g/10 min LD 252 LDPE from Exxon Mobile, from an autoclave reactor, MFI=3.8 g/10 min ENR 7086.01 Ethylene-butene copolymer, MFI<0.5 g/10 min Unicell® DL75N Catalyzed azodicarbonamide from Tracell, gas yield: approx. 180 ml/g Silbyk® 9230 Surface-active substances, including PDMS, and copolymers from BYK Chemie Determination of LCBI (Long Chain Branch Index)

Various methods are available for determining the degree of long chain branching. One is LCBI, which is described, for example, in the reference "Shroff R. N., Mavridis H., Macromolecules, 32 (1999) 8454-8464." The Mark-Houwink equation relating the zero-shear viscosity $\eta_0$ (ZSV=zero-shear viscosity) and the weight-average molecular weight (Mw) of polymers is used for this purpose:

$$\eta_0 = K_\eta \cdot Mw^\alpha$$

This wellknown formula applies to linear polymers. The value Mw for a branched polymer, which is determined according to the above formula from the experimentally obtained value $\eta_0$, however, with the values of the constants $K_\eta$ and $\alpha$ for the linear polymer equivalent, (Mw $\eta_0$), therefore differs from the value determined by means of GPC for the branched polymer (Mw$_{GPC}$). The ratio of Mw $\eta_0$ to Mw$_{GPC}$ is known as the LCBI.

The weight-average molecular weight (Mw) of the polymers presented here can be determined by GPC at 160° C. in 1,2,4-trichlorobenzene relative to polystyrene standards. The constants $K_\eta$ and $\alpha$ for commercial EVA with a vinyl acetate content of 28 wt. % were derived from literature values as follows: $1.24 \times 10^{-15}$ and 3.59 for $K_\eta$ and $\alpha$, respectively.

Determination of Foam Density/Volume Expansion

The densities of the starting compounds and the foamed materials produced were obtained by measuring the weights of the samples in two media of different densities (water and air) according to Archimedes' principle. The volume expansion was determined by dividing the densities of the sample before and after foaming.

Determination of the Viscosity

The value of the complex viscosity was determined with a MCR 301 rheometer (Anton Paar) between parallel plates at 190° C. and 1% elongation under inert gas (N$_2$) in oscillation as a function of the angular frequency.

Determination of the Extensional Viscosity/Strain Curing

The extensional viscosity was determined using a MCR 301 rheometer (Anton Paar), equipped with a Sentmanat extensional viscosity tool (SER2) at extension rates of 0.01-8 and Hencky strains up to a maximum of 3.7. Strain curing (S) was determined as the ratio of the measured extensional viscosity at a Hencky strain of 1.9 and the corresponding value of the linear elastic startup behavior corresponding to the Maxwell model.

Production of Long Chain Branched EVA
(LCB-EVA)

An ultra-long chain branched modification of EVA was produced based on Elvax® 265A. For this purpose, Elvax® 265A with 0.25 wt. % Luperox® A75FP (75 wt. % dibenzoyl peroxide in water) was subjected to reactive extrusion in a twin-screw extruder at a temperature of 180° C. The screw speed was 200 rpm, which corresponds to a residence time of about 2 min. The long chain branched modification of EVA used here had an LCBI of 1.3.

Examples 1 to 5

Formulations based on Elvax® 265A were prepared as matrix material. The polymer was used alone or in a mixture with a modifying agent selected from Elvax® 670, LCB-EVA, LD 380 BA, LD 252 and ENR 7086.01. To ensure comparability, Elvax® 265A and optionally modifying agents in the weight ratios shown in the Figures were always used for the formulation in an overall fraction of 93.5 parts by weight and Unicell DL75N was used as the blowing agent in a fraction of 6.5 parts by weight.

The formulation was mixed in a Brabender high-shear mixer at 40 rpm, wherein first the matrix polymer, followed by the modifying agent, and then the blowing agent were introduced. The complete formulation was mixed for 2 min at melt temperatures of less than 105° C. to avoid premature foaming.

Disk-shaped samples (thickness 2 mm, diameter 25 mm) made from the formulations obtained were placed on silicone-coated paper (carrier paper) and foamed in a convection oven at 191° C. for 5 and 12 min.

The volume expansion in percent produced by the modifying agent is shown in FIGS. 1 to 5 as a function of baking time and weight-fraction of the modifying agent. The upper horizontal line in the Figures provides the theoretical maximum volume expansion based on quantity of blowing agent used. In the figures, the triangles indicate values for a baking time of 5 min, rectangles for a baking time of 12 min and diamonds for a baking time of 20 min.

With all modifying agents, at suitable mixing ratios and baking times, a slowed cell growth and thus increased volume expansion are observed at baking times of 5 and 12 min compared with the use of EVA without modifying agent.

Surprisingly, the admixture of up to 10 wt. % long chain branched polymers into linear thermoplastic polymers, relative to the total weight of both polymers, does not cause any increase in the shear and strain viscosity, but nevertheless a reduced cell growth is achieved. Increased viscosity is only produced at an amount of more than 10 wt. %.

In contrast to the other modifying agents, blends with LCB-EVA exhibit the same foaming start temperature as pure EVA. Although not crosslinked and also unchanged in rheologic properties, foam structures made from blends with up to 10 wt. % LCB-EVA polymers collapse with a time delay. The admixture of 10-30 wt. % LCB-EVA into commercial EVA leads to an optimal result in terms of low change in viscosity, reduced cell growth and increased foam stability.

In particular, the initial (5 min) volume expansion remains unchanged at a concentration of up to 10 wt. % LCB-EVA. In contrast to the other modifying agents, the volume expansion after 12 min and especially after 20 min rose with increasing LCB-EVA concentration, reaching a maximum in the range of 10-30 wt. %. LCB-EVA is the only modifying agent tested that enables improved stability of the foam structure even at a 20 minute baking time.

On the other hand, high-molecular-weight Elvax® 670, LDPE and ethylene-butene copolymer at contents of up to 10 wt. % act as nucleating agents and reduce diffusion-controlled cell growth, which increases the maximum volume expansion and shifts its peak toward longer baking times. However, they do not enable stabilization of the foam, i.e., the collapse of the foam cannot be prevented with time with these modifying agents. In addition, further increasing the content of the long chain branched polymers to 10-30 wt. %, if it does not involve LCB-EVA, results in massively reduced foaming even at 5 min baking time. The positive effect thus becomes a negative one, in analogy to Comparison Example 1.

Figure 7:
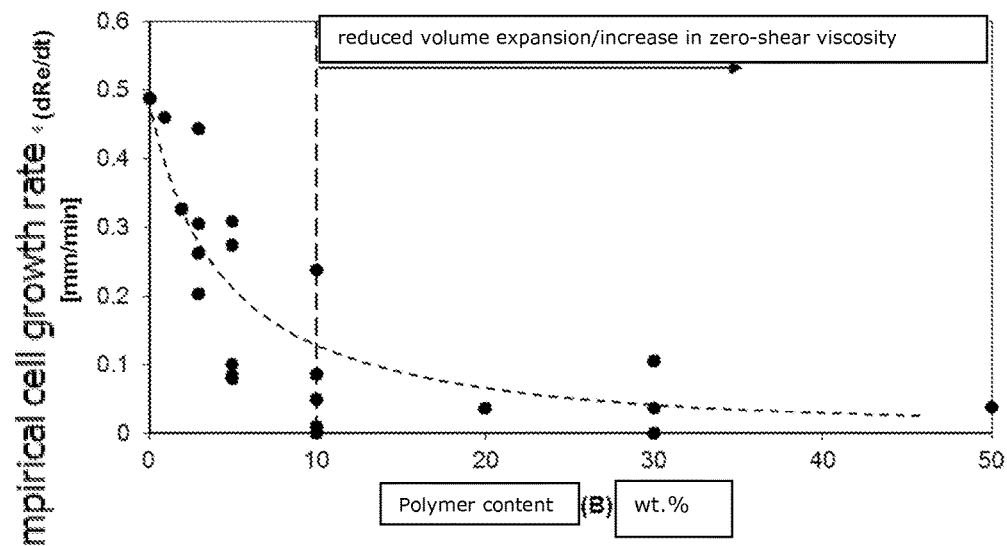
FIG. 7 is a graph of polymer content (B) (wt. %) vs. empirical cell growth rate, according to an exemplary aspect.

In FIG. 7 the empirical cell growth rate in mm/min is shown as a function of the concentration of the foam stabilizers used according to the invention used. The samples were produced as in Examples 1 to 5. The mean cell size was determined based on images of the stained surfaces of sections through a foamed sample, using the Lince Software provided by TU Darmstadt. The empirical cell growth rate (dRe/dt) was determined using the following equation:

$$dRe/dt=[(\text{cell diameter}(12 \text{ min baking time})-\text{cell diameter } (5 \text{ min baking time})]/7$$

Figure 8:
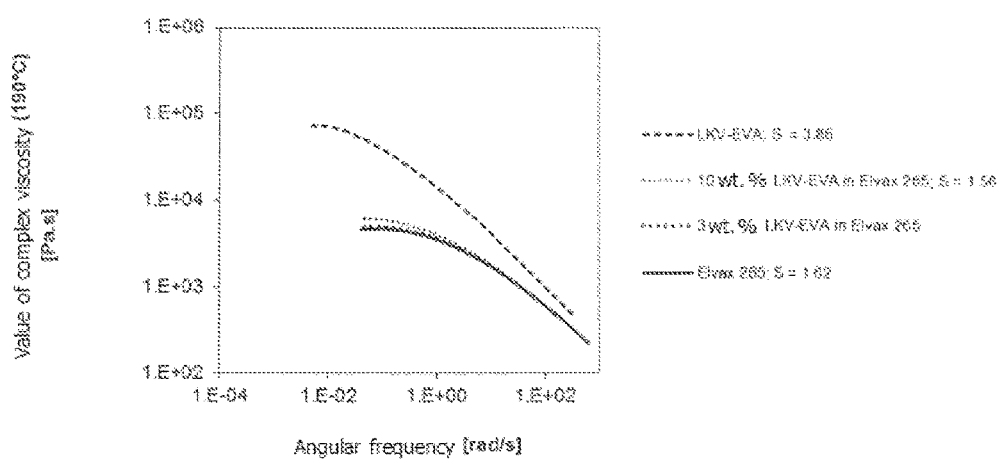
FIG. 8 is a graph of angular frequency vs. value of complex viscosity, according to an exemplary aspect.

The results demonstrate the reduced cell growth due to the addition of the foam stabilizer. Quantities of up to 10 wt. % foam stabilizer do not produce an increase in the shear and strain viscosities, as shown in FIG. 8 as an example for LCB-EVA.

Comparison Example 1

Figure 6:
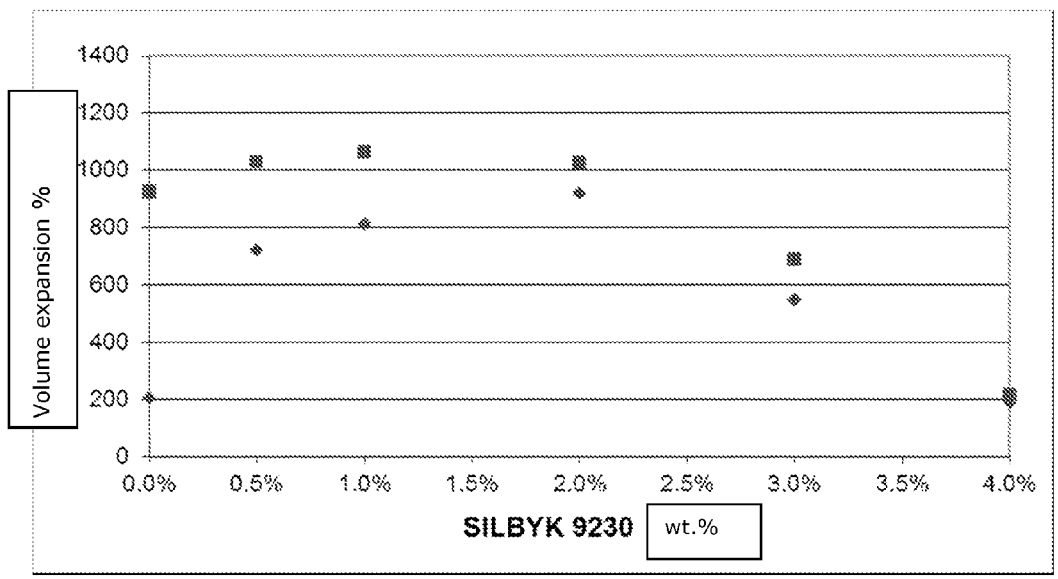
FIG. 6 is a graph of SILBYK 9230 (wt. %) vs. volume expansion %, according to an exemplary aspect.

Formulations were produced in the same manner as for Examples 1 to 5, except that Silbyk 9230 was used as the foam stabilizer instead of the modifiers given there. The evaluation was also performed in analogy to Examples 1 to 5. The results and the quantities of modifier used are shown in FIG. 6.

The invention claimed is:
1. Foamable thermoplastic mixture, comprising
(A) at least one thermoplastic polymer selected from the group consisting of ethylene-vinyl acetate copolymer (EVA), ethylene methyl acrylate copolymer (EMA), ethylene butyl acrylate copolymer (EBA), polyethylene (PE), and polypropylene (PP),
(B) at least one long chain branched polymer with a g value, determined on the basis of high temperature GPC, as the ratio of the intrinsic viscosity of the polymer to be analyzed to the intrinsic viscosity of the PE-Standard NBS 1475 according to Kulin et al., Pure and Applied Chemistry 1988, 6, (9), p. 1403-1415, of less than 1 as a foam stabilizer selected from the group consisting of ethylene-vinyl acetate copolymer (EVA), ethylene methyl acrylate copolymer (EMA), ethylene butyl acrylate copolymer (EBA), ethylene-hexene copolymer, ethylene-butene copolymer, ethylene-octene copolymer, polyethylene (PE), polypropylene (PP) and ethylene-propylene copolymer
and
(C) at least one chemical blowing agent,
wherein the long chain branched polymer (B) is present in an amount of 1 to 10 wt. % relative to the total weight of thermoplastic polymer (A) and long chain branched polymer (B), and at least one of the following distinguishing features applies for the thermoplastic polymer (A) and the long chain branched polymer (B):
1) the value of the melt flow index (MFI), determined at 190° C. and 2.16 kg according to ASTM D1238, of the long chain branched polymer (B) (MFI(B)) is smaller than the MFI value of the thermoplastic polymer (A) (MFI(A)), wherein MFI(B) is a maximum of 50% of MFI(A),
2) the g value of the long chain branched polymer (B) (g(B)) is smaller than the g value of the thermoplastic polymer (A) (g(A)), wherein g(B) is a maximum of 80% of g(A),
3) the polymer type of the long chain branched polymer (B) differs from the polymer type of the thermoplastic polymer (A).

2. Foamable thermoplastic mixture according to claim 1, wherein the fraction of the at least one thermoplastic polymer (A) is in the range of 40 to 97 wt. % relative to the total weight of the foamable thermoplastic mixture.

3. Foamable thermoplastic mixture according to claim 1, wherein the thermoplastic polymer (A) is ethylene-vinyl acetate copolymer (EVA).

4. Foamable thermoplastic mixture according to claim 1, wherein the long chain branched polymer (B) is an ethylene-vinyl acetate copolymer.

5. Foamable thermoplastic mixture according to claim 1, wherein the thermoplastic polymer (A) has a melt flow index (MFI) in the range of 0.1 to 100 g/10 min.

6. Foamable thermoplastic mixture according to claim 1, wherein the long chain branched polymer (B) has a LCBI, of at least 1.1 and a g value of no more than 0.8, respectively.

7. Foamable thermoplastic mixture according to claim 1, wherein the fraction of the at least one chemical blowing agent is in the range of 0.1 to 20 wt. % relative to the total weight of the foamable thermoplastic mixture.

8. Foamable thermoplastic mixture according to claim 1, wherein it can be injection molded without foaming.

9. Foamable thermoplastic mixture according to claim 1, wherein the thermoplastic polymer (A) is selected from ethylene-vinyl acetate copolymer (EVA), ethylene methyl acrylate copolymer (EMA) or ethylene butyl acrylate copolymer (EBA) and the long chain branched polymer (B) is selected from polyethylene (PE), ethylene-hexene copolymer, ethylene-butene copolymer or ethylene-octene copolymer.

10. Foamed material obtainable by heating the foamable thermoplastic mixture according to claim 1.

11. Method for producing a foamed material, in which a foamable thermoplastic mixture according to claim 1 is heated to form the foamed material.

12. Foamable thermoplastic mixture, comprising
(A) at least one thermoplastic polymer selected from the group consisting of ethylene-vinyl acetate copolymer (EVA), ethylene methyl acrylate copolymer (EMA), ethylene butyl acrylate copolymer (EBA), polyethylene (PE), and polypropylene (PP),
(B) at least one long chain branched polymer with a g value, determined on the basis of high temperature GPC, as the ratio of the intrinsic viscosity of the polymer to be analyzed to the intrinsic viscosity of the PE-Standard NBS 1475 according to Kulin et al., Pure and Applied Chemistry 1988, 6, (9), p. 1403-1415, of less than 1 as a foam stabilizer selected from the group consisting of ethylene-vinyl acetate copolymer (EVA), ethylene methyl acrylate copolymer (EMA), ethylene butyl acrylate copolymer (EBA), polyethylene (PE), and polypropylene (PP)
and
(C) at least one chemical blowing agent,
wherein the long chain branched polymer (B) is present in an amount of 1 to 30 wt. % relative to the total weight of thermoplastic polymer (A) and long chain branched polymer (B), and
at least one of the following distinguishing features applies for the thermoplastic polymer (A) and the long chain branched polymer (B):
1) the value of the melt flow index (MFI), determined at 190° C. and 2.16 kg according to ASTM D1238, of the long chain branched polymer (B) (MFI(B)) is smaller than the MFI value of the thermoplastic polymer (A) (MFI(A)), wherein MFI(B) is a maximum of 50% of MFI(A),
2) the g value of the long chain branched polymer (B) (g(B)) is smaller than the g value of the thermoplastic polymer (A) (g(A)), wherein g(B) is a maximum of 80% of g(A),
wherein the thermoplastic polymer (A) and the long chain branched polymer (B) are of the same polymer or copolymer type.

13. Foamable thermoplastic mixture according to claim 12, wherein the fraction of the at least one thermoplastic polymer (A) is in the range of 40 to 97 wt. % relative to the total weight of the foamable thermoplastic mixture.

14. Foamable thermoplastic mixture according to claim 12, wherein the thermoplastic polymer (A) has a melt flow index (MFI) in the range of 0.1 to 100 g/10 min.

15. Foamable thermoplastic mixture according to claim 12, wherein the long chain branched polymer (B) has a LCBI, of at least 1.1 and a g value of no more than 0.8, respectively.

16. Foamable thermoplastic mixture according to claim 12, wherein the fraction of the at least one chemical blowing agent is in the range of 0.1 to 20 wt. % relative to the total weight of the foamable thermoplastic mixture.

17. Foamable thermoplastic mixture according to claim 12, wherein it can be injection molded without foaming.

18. Foamed material obtainable by heating the foamable thermoplastic mixture according to claim 12.

19. Method for producing a foamed material, in which a foamable thermoplastic mixture according to claim 12 is heated to form the foamed material.

20. Foamable thermoplastic mixture according to claim 12, wherein the thermoplastic polymer (A) and the long chain branched polymer (B) are each ethylene-vinyl acetate copolymers.

21. Foamable thermoplastic mixture according to claim 12, wherein the long chain branched polymer (B) differs from thermoplastic polymer (A) according to distinguishing feature 2) and the long chain branched polymer (B) is present in an amount of 10 to 30 wt. % relative to the total weight of thermoplastic polymer (A) and long chain branched polymer (B).

* * * * *